(12) United States Patent
Boamfa et al.

(10) Patent No.: US 10,684,461 B2
(45) Date of Patent: Jun. 16, 2020

(54) DIGITAL PATHOLOGY SYSTEM

(71) Applicant: KONINKLIJKE PHILIPS N.V., Eindhoven (NL)

(72) Inventors: Marius Iosif Boamfa, Eindhoven (NL); Anke Pierik, Eindhoven (NL); Reinhold Wimberger-Friedl, Eindhoven (NL); Marinus Bastiaan (Rien) Van Leeuwen, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 160 days.

(21) Appl. No.: 15/744,962

(22) PCT Filed: Jul. 15, 2016

(86) PCT No.: PCT/EP2016/066884
§ 371 (c)(1),
(2) Date: Jan. 15, 2018

(87) PCT Pub. No.: WO2017/009450
PCT Pub. Date: Jan. 19, 2017

(65) Prior Publication Data
US 2018/0267290 A1    Sep. 20, 2018

(30) Foreign Application Priority Data

Jul. 16, 2015 (EP) .................... 15176985

(51) Int. Cl.
*G02B 21/36* (2006.01)
*G02B 21/00* (2006.01)
(Continued)

(52) U.S. Cl.
CPC ............. *G02B 21/367* (2013.01); *G01N 1/30* (2013.01); *G02B 21/0068* (2013.01); *G02B 21/12* (2013.01); *G02B 21/34* (2013.01)

(58) Field of Classification Search
CPC ...... G01N 1/30; G02B 21/0068; G02B 21/12; G02B 21/34; G02B 21/367;
(Continued)

(56) References Cited

U.S. PATENT DOCUMENTS

| 4,255,014 A | 3/1981 | Ellis |
| 7,133,543 B2 * | 11/2006 | Verwoerd ............. G06T 7/0012 |
| | | 382/128 |

(Continued)

FOREIGN PATENT DOCUMENTS

| WO | 2008080403 A1 | 7/2008 |
| WO | 2013099190 A1 | 7/2013 |

OTHER PUBLICATIONS

Lowe, David G. "Distinctive Image Features from Scale-Invariant Keypoints", International Journal of Computer Vision, 2004.
(Continued)

*Primary Examiner* — Jingge Wu
(74) *Attorney, Agent, or Firm* — Sherry Austin

(57) ABSTRACT

The present invention relates to digital pathology. In order to improve the workflow in the process of selecting a region of interest of an unstained sample to be removed for molecular diagnostic, a method (100) is provided for selecting a sample removing area of an unstained sample to be removed for molecular diagnostic. The method comprises the following steps: In a first step 102, also referred to as step a), a reference removing area is selected in a reference image of a reference slice of an object, wherein biological material in the reference slice is stained. In a second step 104, also referred to as step b), a digital sample image of a sample slice of the object is obtained under an imaging setting. The biological material in the sample slice is unstained. The sample slice is received on a sample slide and positioned in an optical path between a light source and an image detector. In the optical path between the light source and the image
(Continued)

detector, it is further provided a contrast enhancing arrangement for improving contrast between the unstained biological material and background. Light is provided passing through the sample slice to be received by the image detector. In a third step 106, also referred to as step c), the digital sample image is registered with the reference image for translating the reference removing area in the reference image to the digital sample image. In a fourth step 108, also referred to as step d), a sample removing area is identified in the digital sample image based on the translated reference removing area.

14 Claims, 7 Drawing Sheets

(51) Int. Cl.
G02B 21/12 (2006.01)
G02B 21/34 (2006.01)
G01N 1/30 (2006.01)

(58) Field of Classification Search
CPC ............ G06K 2209/07; G06K 9/0014; G06T 2207/10056; G06T 2207/30024; G06T 2207/30072; G06T 7/0014; G06T 7/337
See application file for complete search history.

(56) References Cited

U.S. PATENT DOCUMENTS

| | | | |
|---|---|---|---|
| 8,229,194 B2 | 7/2012 | Grunkin | |
| 9,405,111 B2* | 8/2016 | Schaffer | G02B 7/006 |
| 2005/0117144 A1* | 6/2005 | Greenway | B01D 9/00 356/30 |
| 2006/0139621 A1* | 6/2006 | Baer | G01N 1/2813 356/36 |
| 2010/0204584 A1* | 8/2010 | Ornberg | A61B 3/101 600/476 |
| 2010/0208955 A1* | 8/2010 | Mehes | G01N 21/6452 382/128 |
| 2011/0222059 A1 | 9/2011 | Behrend | |
| 2011/0228072 A1* | 9/2011 | Van Leeuwen | A63B 43/02 348/79 |
| 2011/0268331 A1* | 11/2011 | Binning | G06F 19/321 382/131 |
| 2012/0045790 A1* | 2/2012 | Van Dijk | G06T 7/0014 435/29 |
| 2012/0257811 A1 | 10/2012 | Metzger | |
| 2013/0265405 A1 | 10/2013 | Respini | |
| 2014/0270457 A1* | 9/2014 | Bhargava | G06K 9/0014 382/133 |
| 2015/0142333 A1* | 5/2015 | Diem | A61B 5/0071 702/19 |
| 2017/0191937 A1* | 7/2017 | Levenson | G01N 21/6458 |
| 2018/0247101 A1* | 8/2018 | Wimberger-Friedl | G06K 9/0014 |

OTHER PUBLICATIONS

Delahunt, Charles et al "Limitations of Haemozoin-based Diagnosis of Plasmodium Falciparum using Dark-Fieid Microscopy", Malaria Journal, vol. 13, No. 1, 2014.

Norris, Jeremy L. et al "Analysis of Tissue Specimens by Matrix-Assisted Laser Desorption/Ionization Imaging Mass Spectrometry in Biological and Clinical Research", American Chemical Society, Chemical Reviews, vol. 113, No. 4. 2013.

* cited by examiner

DIGITAL PATHOLOGY SYSTEM

CROSS-REFERENCE TO PRIOR APPLICATIONS

This application is the U.S. National Phase application under 35 U.S.C. § 371 of International Application No. PCT/EP2016/066884, filed on Jul. 15, 2016, which claims the benefit of European Patent Application No. 15176985.8, filed on Jul. 16, 2015. These applications are hereby incorporated by reference herein.

FIELD OF THE INVENTION

The present invention relates to the field of digital pathology, and in particular to a system used in digital pathology, to a method for integrating digital pathology with molecular diagnostics. Furthermore, the invention relates to a computer program element as well as to a computer-readable medium.

BACKGROUND OF THE INVENTION

Digital Pathology refers to the creation, viewing, management, sharing, analysis, and interpretation of digital images of sample slides comprising biological material (e.g. tissues) and includes workflow considerations unique to a digital imaging environment. An important performance aspect of digital pathology is the quality of the digital images. For example, some digital images may have a weak contrast, when the sample slides comprise unstained biological material, such as unstained tissue. The weak contrast may affect the readability of the digital images and thus make it difficult for e.g. automatic registration by a computer algorithm. For example, U.S. Pat. No. 8,229,194 B2 describes an image registration method.

SUMMARY OF THE INVENTION

There may be a need to provide a system for improving the workflow in the process of selecting a region of interest of an unstained sample to be removed for molecular diagnostic.

The object of the present invention is solved by the subject-matter of the independent claims, wherein further embodiments are incorporated in the dependent claims. It should be noted that the following described aspects of the invention apply also for the system for use in digital pathology, for the method for integrating digital pathology with molecular diagnostics, for the computer program element, and for the computer-readable medium.

According to a first aspect of the present invention, a method is provided for selecting a sample removing area of an unstained sample to be removed for molecular diagnostic. The method comprises the following steps:
a) selecting a reference removing area in a reference image of a reference slice of an object; wherein biological material in the reference slice is stained;
b) obtaining a digital sample image of a sample slice of the object under an imaging setting, wherein the biological material in the sample slice is unstained. The sample slice is received on a sample slide and positioned in an optical path between a light source and an image detector. In the optical path between the light source and the image detector, it is further provided a contrast enhancing arrangement for improving contrast between the unstained biological material and background. Light is provided passing through the sample slice to be received by the image detector;
c) registering the digital sample image with the reference image for translating the reference removing area in the reference image to the digital sample image; and
d) identifying a sample removing area in the digital sample image based on the translated reference removing area.

In an example, a method is provided for integrating digital pathology with molecular diagnostics. The method comprises the following steps:
a) receiving a sample slide with a sample slice of an object comprising unstained biological material and positioning the sample slice in an optical path between a light source and an image detector. In the optical path between the light source and the image detector, it is further provided a contrast enhancing arrangement for improving biological material-to-background contrast;
b) providing light passing through the sample slice to be received by the image detector;
c) obtaining a digital sample image of the sample slice under an imaging setting; and
d) registering the digital sample image with a reference image of a reference slice of the object for translating a reference removing area in the reference image to the digital sample image.

Advantageously, the contrast between the unstained biological material (e.g. tissue) and the background (e.g. embedding paraffin) may be increased. The registration device may thus be able to identify the unstained biological material on a sample slide and to automatically register the digital sample slide with the reference slide. This may further enable a digital way of working, without the need of manual registration by looking to the reference slide and comparing the reference slide with the sample slide. The digital pathology workflow may therefore be improved. The increased contrast may also assist a pathologist in detecting unstained biological material and reduce the burden of a user (e.g. a lab technician) for visually comparing the sample slide with unstained biological material with a reference slide to make sure the correct sections are selected for molecular testing.

According to a second aspect of the present invention, a system is provided for selecting a sample removing area of an unstained sample to be removed for molecular diagnostic. The system comprises an image forming device and a registration device. The image forming device comprises a light source, an object receiving arrangement, and an image detector. The light source and the image detector are arranged in an optical path. The light source is configured to provide light passing through a sample slide to be received by the image detector. The object receiving arrangement is configured to receive a sample slide with a sample slice of an object, in which biological material in the sample slice is unstained, and to position the sample slice in the optical path for acquiring a digital sample image of the sample slice. In the optical path between the light source and the image detector, it is further provided a contrast enhancing arrangement for improving contrast between unstained biological material and background. The registration device is configured to receive a reference image of a reference slice of the object, wherein the biological material in the reference slice is stained, and wherein a reference removing area is defined in the reference image. The registration device is further configured to register the digital sample image with the reference image for translating the reference removing area in the reference image to the digital sample image and to identify a sample removing area in the digital sample image based on the translated reference removing area.

In an example, a system is provided for use in digital pathology. The system comprises an image forming device and a registration device. The image forming device comprises a light source, an object receiving arrangement and an image detector. The light source and the image detector are arranged in an optical path. The light source is configured to provide light passing through a sample slide to be received by the image detector. The object receiving arrangement is configured to receive a sample slide with a sample slice of an object comprising unstained biological material and to position the sample slice in the optical path for acquiring a digital sample image of the sample slice. The registration device is configured to register the digital sample image with a reference image of a reference slice of the object for translating a reference removing area in the reference image to the digital sample image. In the optical path between the light source and the image detector, it is further provided a contrast enhancing arrangement for improving biological material-to-background contrast.

According to a third aspect of the invention, a computer program element is provided for controlling an apparatus according to one of the embodiments described above and in the following, which, when being executed by a processing unit, is adapted to perform the inventive method.

According to a fourth aspect of the invention, a computer readable medium is provided having stored the program element.

According to an example, the contrast enhancing arrangement comprises a polarizer arrangement, the polarizer arrangement comprising a first polarizer and a second polarizer. The object receiving arrangement is configured to position the sample slice in the optical path between the first polarizer and the second polarizer.

The provision of the polarizer arrangement may enhance the optical contrast of unstained biological material (e.g. paraffin-embedded unstained tissue) for annotation of regions of interest and/or removing areas by an operator and/or by the automatic registration of regions of interest and/or removing areas defined in a reference image. Thereby, a digital and automated way of sample selection for e.g. molecular diagnostics may be achieved, which may ease the burden of tedious and laborious work to visually compare the paraffin slide with the reference slide.

According to an example, the contrast enhancing arrangement comprises an optical filter arrangement with at least one optical filter selected from the group of:
a colored glass filter;
a colored plastic filter;
a gelatin filter;
a dielectric filter; and
a plasmonic filter.

The use of optical filter(s) may also enhance the contrast between the unstained biological material and the surrounding background that may contain paraffin. With optical filters (e.g. bandpass filters) used in fluorescence detection, it is possible to include autofluorescence (emission of light by biological material, when they have absorbed light) with polarizers.

A colored glass filter may relate to tinted glass.

A colored plastic filter may relate to chromophore dyes embedded in a plastic matrix.

A dielectric filter may comprise a dielectric multilayer structure deposited on a glass or plastic support that acts as selective reflectors or transmission.

A plasmonic filter may relate to color filters based on plasmon resonances, e.g. metal nanostructures deposited on a glass or plastic substrate.

According to an example, the registration device is configured to identify a sample removing area in the digital sample image based on the reference removing area in the reference image.

The identified sample removing area may be used as a reference for finding a removing area on the sample slide.

According to an example, the system further comprises a marking device. The marking device is configured to provide a removing mark on the sample slide based on the sample removing area identified in the digital sample image.

The removing mark indicates the area in which the biological material is to be removed. An operator (e.g. a lab technician) may remove the biological material manually. Alternatively, a dissection device may be utilized to remove the biological material.

According to an example, the system further comprises a dissection device. The dissection device is configured to remove biological material in a removing area from the sample slice. The removing area is provided based on the sample removing area identified in the digital sample image.

By using the dissection device, the risk of contamination (e.g. due to touching the slide with fingers) or lack of precision may be avoided. Furthermore, the sample selection and dissection workflow may be improved.

According to an example, the image forming device is a bright field microscope.

According to an example, step b) further comprises:
c1) acquiring a further digital sample image of the sample slice under a different imaging setting; and
c2) providing a sum of the digital sample image and the further digital sample image as a digital sample image for use in step c).

The digital sample image may comprise intensity variation in the background area (e.g. the area containing paraffin). The combination of two or more digital sample images under different imaging settings may remove or suppress such uneven background and thus increase the similarity between the digital sample image and the reference image for image registration.

According to an example, the imaging setting of step b) comprises at least one parameter of the group of:
mutual orientation of polarizers within the polarizer arrangement;
orientation of the polarizer arrangement with respect to the sample slice;
wavelength of the light; and
arrangement of a birefringent medium in the optical path.

According to an example, the following steps are provided before step c):
e1) calculating an average intensity value of a background area in the digital sample image;
e2) clipping intensity values that are higher than the calculated average intensity value to provide a clipped digital sample image;
e3) performing morphological closing of intensity values of the clipped image to provide a closed digital sample image; and
e4) providing the closed digital sample image as a digital sample image for use in step c);
wherein preferably, it is further provided:
e5) performing morphological closing of intensity values in the reference image to provide a closed reference image; and
e6) providing the closed reference image as a reference image for use in step c).

The digital sample image may also comprise spots (pixels with intensity variations) in the background area. By clipping and morphological closing of intensity values in the digital sample image and optionally in the reference image, the intensity variation in the background area may be smoothed. The similarity in appearance of the image pair (digital sample image and reference image) may be improved for image registration.

According to an example, at least one of the following steps is provided after step d):

f) identifying a sample removing area in the digital sample image based on the reference removing area in the reference image;

g) providing a removing mark on the sample slide based on the sample removing area identified in the digital sample image; and h) removing biological material in an removing area from the sample slice, wherein the removing area is provided based on the sample removing area identified in the digital sample image.

The biological material in the removing area is removed for the purpose of molecular diagnostic tests that are performed on these regions. A better integration of digital pathology and molecular diagnostic may be provided.

In the following description, the term "biological material" relates to tissue, cells, or fluids or other material obtained from a region of a human or non-human. The biological material may be obtained from a living organism, or also from a non-living (dead) organism. For example, depending on a suspected cancer type, biological material may be obtained in different ways such as punch/core biopsy, excisional/incisional biopsy, etc.

The term "object" relates to a sample of biological material, in particular forming a block of material. Hence, the object may also be referred to as "object-sample", "material-sample", or "object-block".

The term "sample slice" relates to a (small) portion of the biological material, e.g. a thin slice of the biological material, such as tissue, cell, or fluids, which are obtained by sectioning e.g. paraffin-embedded pathological specimen (after e.g. chemical fixation, processing and embedding procedures) into thin slices. The thickness of a slice may relate to an order of a few micrometers. For example, the thickness of a sample slice may be 2 to 4 micrometers. Depending on the applications, a sample slice may also have a thickness ranging from 0.5 to 50 micrometers. For example, several sample slices are cut from the object one after the other.

The term "sample slide" relates to glass slides, or other transparent carrier material, onto which sample slices are then mounted onto (glass) slides for precise visualization and/or for image acquisition. Hence, the term "sample" may also be referred to as pathological slide or slide. The sample slides comprise, for example, histopathological slides (i.e. tissue of a biopsy or surgical specimen mounted on slides) as well as cytology slides (i.e. free cells or tissue fragments mounted on slides).

The term "reference slice" may relate to a thin slice of the biological material supported by a reference slide, in which regions of interest (e.g. regions containing biological materials like tissue) or removing areas of interest (e.g. areas in which tissue is scraped off for molecular testing purpose) are annotated or marked either by a computer algorithm or by a user (a pathologist). For example, the reference slice is a stained slice, such as an H&E (hematoxylin and eosin) stained slice, which allows a pathologist to identify regions of interest or removing areas of interest. A pathologist may indicate the regions of interest or removing areas of interest on the reference slice. Additional comments may also be noted as well, e.g. to indicate normal tissue regions that can serve as a reference.

The term "reference slice" may also relate to the preceding unstained sample slice that was imaged with the same optical setup. For example, if there are four slices A, B, C and D, in which slice A is stained (e.g. H&E stained) and slices B, C and D are unstained (or differently treated). It is possible to start with registration of stained slice A with unstained slice B, and then unstained slice B with unstained slice C, and unstained slice C with unstained slice D.

The term "reference removing area" refers to the area in the reference image (e.g. an H&E stained image), which is annotated or marked for indicating a region of interest (e.g. region containing tissue) or a removing area (e.g. an area in which tissues are scraped off for the purpose of e.g. molecular diagnostic tests).

The term "sample removing area" refers to the area in the digital sample image (i.e. digital image of the sample slice), which has overlapping or matching features with the reference removing area.

The term "removing area" refers to the area in the sample slice, where the biological material will be removed and collected in a test tube for further e.g. molecular diagnostic tests.

The term "digital sample image" relates to a digital representation of a sample slice on a sample slide—hence, also referred to as digital slide or digitized glass slide. Image data are created from the sample slide using an image forming device like a scanner. A digital sample image may also be acquired from an image management system (IMS).

The term "reference image" relates to a digital representation of a reference slice. The reference image may contain annotations or marks for indicating e.g. the regions of interest or removing areas of interest as well as comments for indicating e.g. normal tissue regions for serving as a reference. The annotations, marks, and comments may be directly indicated on the reference slide that carries the reference slice or be made digitally e.g. on a computer screen. Likewise, a reference image may be acquired, e.g. by an image scanner or a microscope. Alternatively, a reference image may be provided by an IMS that allows for archival and intelligent retrieval either locally or remotely via the Internet.

According to an aspect of the present invention, a system is provided for enhancing image quality in digital pathology. The system comprises an image forming device, such as a bright field microscope, with two polarizers and/or at least one optical filter for acquiring a digital sample image of a sample slide comprising unstained biological material. The sample slide is arranged between two polarizers oriented at an angle with respect to each other with a transmission mode illustration. The angle of the polarizers may be chosen between 0° and 90° for optimal contrast. The optical filter may also be used for enhancing the contrast. For example, the optical filter may be provided as a bandpass filter for fluorescence detection. It is also possible to combine the optical filter and the two polarizers to include autofluorescence with polarization. Registration of the digital sample image obtained with the polarizers and/or the optical filter and the reference image (e.g. H&E stained image) can be done using image registration based on matching image features that exhibit similar appearance. However, the similarity in appearance of the image pair—the digital sample image and the reference image—may be relatively low, e.g. due to intensity variations in a background area surrounding the biological material. In order to reduce the background structure in the digital sample image of the unstained sample and to improve similarity in appearance of the image pair, two methods are proposed: (i) a method based on image processing; and (ii) a method that uses a combination of at least two images acquired with polarizer pairs and/or an optical filter. In this manner, image quality, e.g. contrast and similarity, may be further improved. As a result, the performance of registration of the reference slide with the unstained sample may also be enhanced. Based on the registration results, the system may further comprise a marking device for marking or indicating a removing area on the sample slide. A dissection device may also be provided for removing biological material inside the removing area for the purpose of molecular diagnostics. In this way, the sample selection workflow may also be improved.

These and other aspects of the present invention will become apparent from and be elucidated with reference to the embodiments described hereinafter.

BRIEF DESCRIPTION OF THE DRAWINGS

Exemplary embodiments of the invention will be described in the following with reference to the following drawings.

DETAILED DESCRIPTION OF EMBODIMENTS

Figure 1:
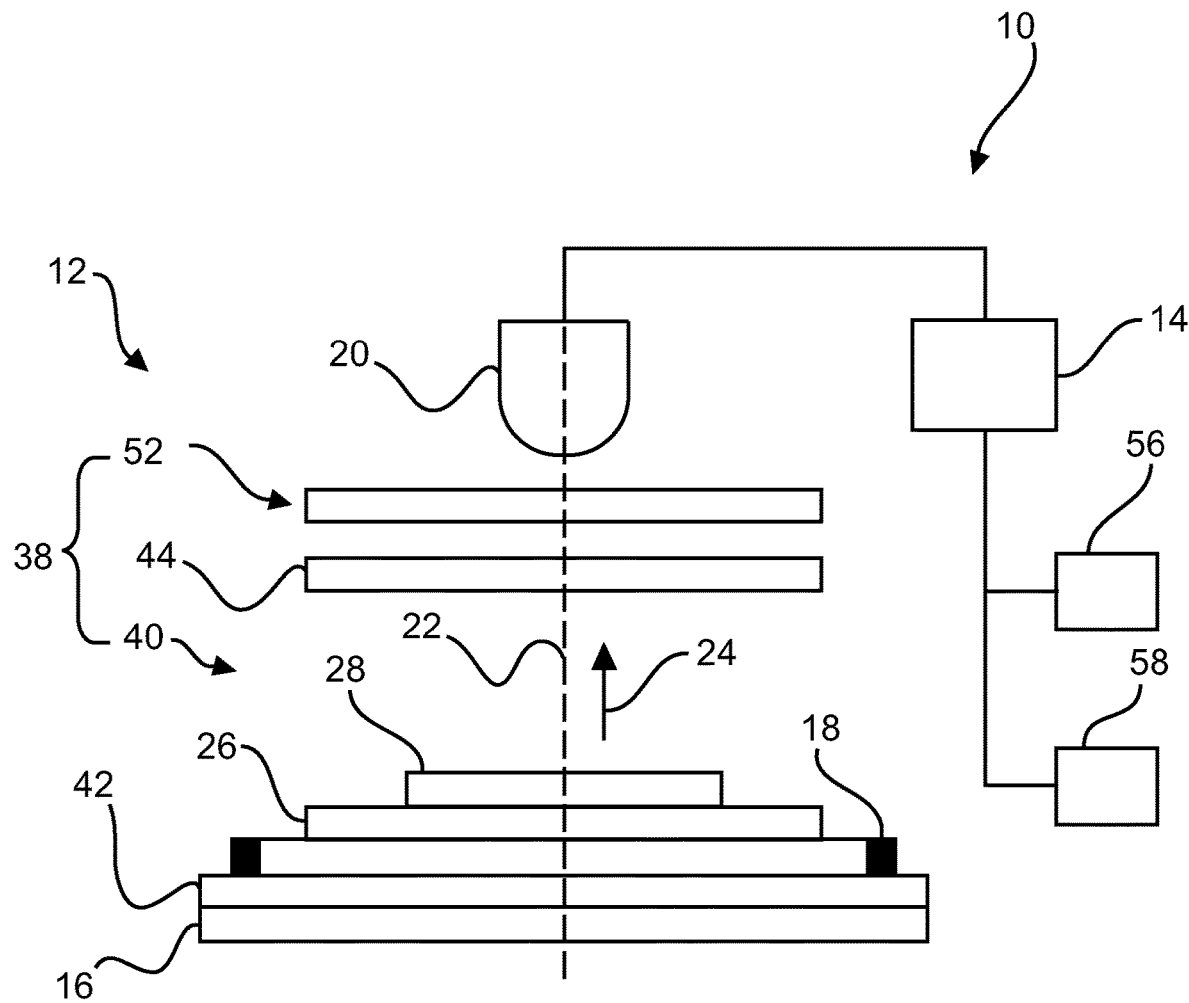
FIG. 1 shows an example of a system for use in digital pathology.

FIG. 1 shows an example of a system 10 for use in digital pathology. The system 10 comprises an image forming device 12 and a registration device 14. The image forming device 12 comprises a light source 16, an object receiving arrangement 18 (not shown in detail) and an image detector 20. The light source and the image detector are arranged in an optical path 22 (indicated with a dashed line). The dashed line is for illustration purpose only and forms no part of the claimed invention.

The light source 16 is configured to provide light 24 (indicated with an arrow) passing through a sample slide 26 to be received by the image detector 20. The object receiving arrangement 18 is configured to receive a sample slide 26 with a sample slice 28 of an object comprising unstained biological material and to position the sample slice 28 in the optical path 22 for acquiring a digital sample image 30 (not shown in FIG. 1, see examples in FIGS. 2B and 3B) of the sample slice 28. The registration device 14 is configured to receive a reference slice 34 (not shown in FIG. 1, see examples in FIGS. 2A and 3A) of the object. The biological material in the reference slice 34 is unstained. A reference removing area 36 (see FIG. 3A) is selected in the reference image 32. The registration device 14 is configured to register the digital sample image 30 with the reference image 32 of the reference slice 34 of the object for translating the reference removing area 36 (see FIG. 3A) in the reference image 32 to the digital sample image 30. The registration device 14 is further configured to identify a sample removing area 54 (see FIG. 3B) in the digital sample image 30 based on the translated reference removing area 36 in the reference image 32 (see FIGS. 3A and 3B).

In the optical path 22 between the light source 16 and the image detector 20, it is further provided a contrast enhancing arrangement 38 for improving biological material-to-background contrast.

As will be appreciated by those of ordinary skill in the art, the image forming device 12 may comprise other optical components, such as illumination optics, objective lens, tube lens, etc. To facilitate explanation of the present techniques, however, these additional (or optional) optical components will not be discussed herein. The image forming device may also be referred to as image acquisition device.

In an example, the image forming device 12 is a bright field microscope.

As an example, the light source 16 may be a white LED provided as backlight illumination for homogeneous illumination of the sample slide 26. If desired, a translation device may be provided for control of a translational movement of the light source 16 for scanning the sample slice 28.

The sample slice 28 comprises unstained biological material, which may be embedded in paraffin. The sample slice 28 may be supported, for example placed or secured ("mounted"), on the sample slide 26, and then both are inserted together in the optical path 22 by the object receiving arrangement 18 for viewing and/or for image acquisition. Although not illustrated in FIG. 1, a cover, for example a thin glass layer or plate, may be provided to protect and hold the sample slice 28.

The object receiving arrangement 18 may comprise manual or motorized stages with slide holders (e.g. slide clips, slide clamps or a cross-table) for fixing the sample slide in place. The slide holders may also be motorized to achieve precise, remote movement of the slide upon the stages, for example, in an automated/computer operated system, particularly where touching the slide with fingers is inappropriate either due to the risk of contamination or lack of precision.

The light 24 passing through the sample slide 26 is captured by the image detector 20. The image detector may be provided as a type of sensor similar to those used in a digital camera for obtaining an image, which is then displayed on a computer monitor or saved and transferred to an Image Management System. These sensors may use complementary metal-oxide-semiconductor (CMOS) or charge-coupled device (CCD) technology, depending on the application. If the image forming device 12 is designed to be a slide scanner, a line-scan camera may be used as the image detector 20.

To improve biological material-to-background contrast, the contrast enhancing arrangement 38 is arranged in the optical path 22 between the light source 16 and the image detector 20.

In an example, shown as an option in FIG. 1, the contrast enhancing arrangement 38 comprises a polarizer arrangement 40. The polarizer arrangement 40 comprises a first polarizer 42 and a second polarizer 44. The object receiving arrangement 18 is configured to position the sample slice 28 in the optical path 22 between the first polarizer 42 and the second polarizer 44 for image acquisition.

The first polarizer may be referred to as polarizer, whereas the second polarizer may be referred to as analyzer.

The first polarizer and the second polarizer may be rotatable with respect to each other.

A polarizing plate (polarizing filter) or polarizing prism may be used as a polarizer to change light to polarized light, for example, linearly polarized light.

In an example, the first and second polarizers are crossed, i.e. their vibration azimuths are positioned at right angles to each other. If no sample is placed on the microscope stage (or support for the microscope slide), light cannot pass through the optical system and a dark background is presented in the image. When illuminated, the paraffin in the sample slice on the microscope slide changes the vibration direction of the polarized light, which produces bright areas on the dark background in the image, because light is partially transmitted by the analyzer (the second polarizer).

In a further example, the first and second polarizers are parallel, i.e. their vibration azimuths are positioned parallel to each other. Unlike the first configuration, when no sample is placed on the microscope stage, light passes through the optical system and creates a bright background. The presence of the paraffin in the sample slice changes the vibration direction of the polarized light and thus produces dark areas on the bright background in the image.

With both arrangements of the polarizers, the contours of the tissue can be discriminated clearly and also details within the tissue are visible. The brightness of the areas depends on the polarizer orientation. The paraffin becomes bright in crossed polarizer arrangement, whereas the tissue becomes brighter in parallel polarizer arrangement. This is caused by the differences in birefringence between tissue and paraffin. The paraffin that is present inside the tissue area is locally different, which leads to the visibility of tissue morphologies.

Figure 2A:
FIG. 2A shows an example of a reference image.

For example, FIG. 2A shows the reference image 32 of a paraffin-embedded tissue stained with H&E. In FIG. 2A, the reference (H&E slide) image 32 is shown without the use of polarizers, in which the tissue sections 46 of the reference slice 34 are clearly visible.

Figure 2B:
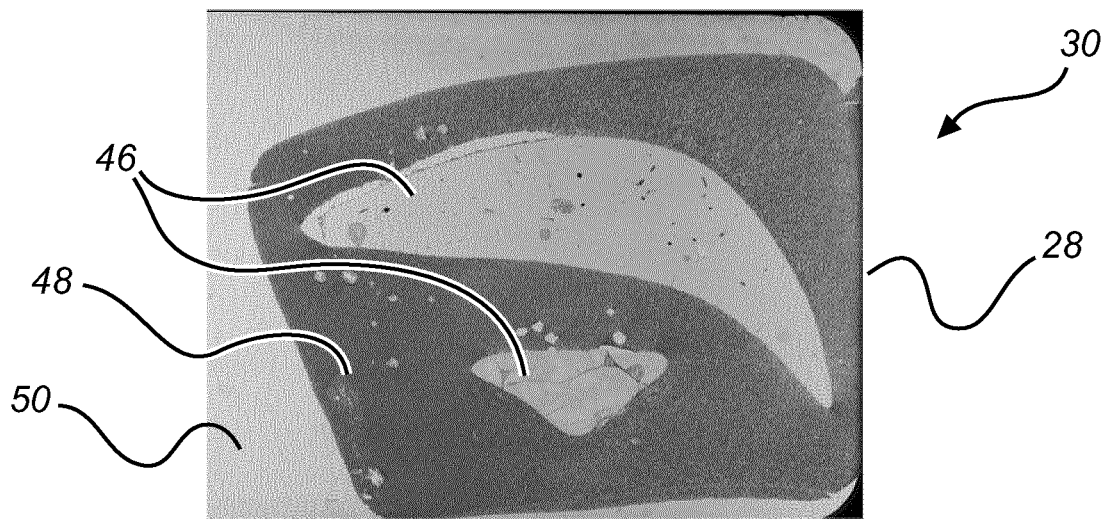
FIG. 2B shows a digital sample image of FIG. 2A obtained with two polarizers parallel to each other.

In FIG. 2B, the digital sample image 30 is acquired when the two polarizers are in a parallel configuration. For clarification, different areas—tissue sections 46, paraffin area 48, and glass 50—are depicted.

In principle, any angle between the two polarizers can be used to optimize the desired contrast and detectable features. For example, the angle between the vibration azimuths of the first and second polarizers may be 10°, 30°, 60°, or any other suitable degrees.

In a still further example, information of multiple images taken with different polarizer orientations may be combined.

By using the polarizer arrangement, the contrast between the unstained biological material and the background area surrounding the biological material (e.g. the area containing paraffin) may be improved. The improved contrast may enhance the visibility of the biological material against the background.

In a further example, also shown in FIG. 1 as an option, the contrast enhancing arrangement comprises an optical filter arrangement 52 with at least one optical filter selected from the group of: a colored glass filter; a colored plastic filter; a gelatin filter; a dielectric filter; and a plasmonic filter.

The optical filter is used to selectively pass light of a small range of colors while reflecting or absorbing other colors. The optical filter may be chosen to match the spectral excitation and emission characteristics of the fluorophore labeled biological material or autofluorescencing biological material. In other words, an optical filter that attenuates all of the light transmitted by the excitation filter and very efficiently transmits any fluorescence emitted by the labeled biological material or the autofluorescencing biological material.

The optical filter may be configured to comprise at least one of the group of: a bandpass filter, a longpass cut-on filter, and a shortpass cut-on filter.

A bandpass filter has a well-defined short wavelength cut-on and long wavelength cut-off. A longpass cut-on filter attenuates shorter wavelengths and transmits longer wavelengths over the active range of the spectrum (which depends on the specific application). A shortpass cut-on filter attenuates longer wavelengths and transmits shorter wavelengths over the active range of the spectrum.

It is also noted that although both the polarizer arrangement 40 and the optical filter arrangement 52 are illustrated in FIG. 1, they are provided as options.

In an example, only the polarizer arrangement 40 is provided and arranged in the optical path 22. In a further example, only the optical filter arrangement 52 is provided and arranged in the optical path 22. In a still further example, as shown in FIG. 1, both the polarizer arrangement 40 and the optical filter arrangement 52 are provided and arranged in the optical path 22.

The (contrast-enhanced) digital sample image 30 is registered with the reference image 32 for translating the reference moving area 36 in the reference image 32 to the digital sample image 30 by the registration device 14.

In an example, the registration device 14 relates to an image processing unit.

As indicated above, the reference removing area 36 relates to the areas in which tissues are scraped off for e.g. molecular testing purpose. In an example, the reference removing area 36 in the reference image 32 is based on morphology or a staining pattern of the reference slice 34.

A pathologist may digitally select a reference removing area in the reference image. For selecting the reference removing area in the reference image, the corresponding reference slice is typically previously stained, for example with H&E. A pathologist may also annotate a reference removing area directly on the reference slice, for example, by using different colours of pen to indicate different regions within a tissue on a reference slide. The annotated slide can be used as a reference slide. Alternatively, a pathologist may annotate digitally on the screen the reference removing area. As a further example, the reference removing area may be detected with the aid of a computer algorithm, which for example determines the reference removing area in the reference image based on certain features (intensity, color, brightness, etc).

The registration may be done by detecting overlapping features between the reference image and digital sample image. The digital sample image may be rotated, translated, or stretched to match the reference image.

For example, for the image registration, at least some features (e.g. A, B, C) in the reference image project onto similar features (e.g. A', B', C') in the sample image.

Figure 3A:
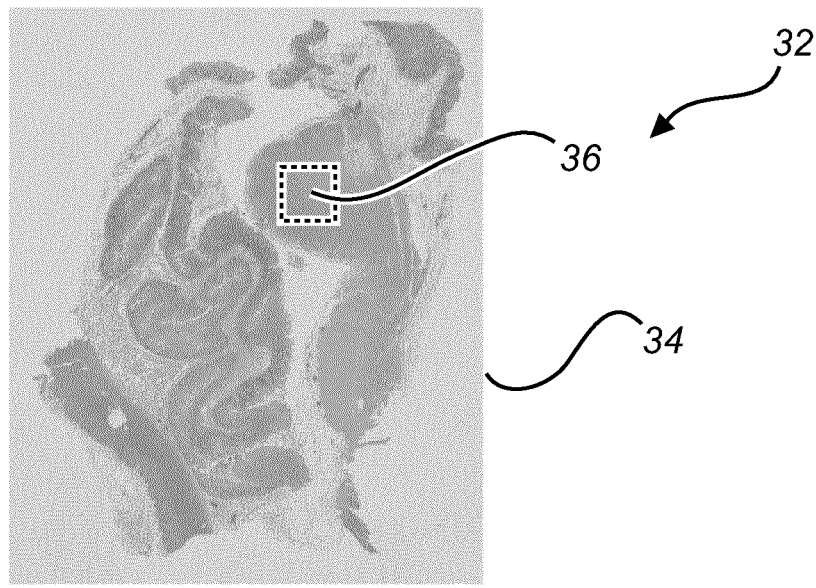
FIG. 3A shows a further example of a reference image.
Figure 3B:
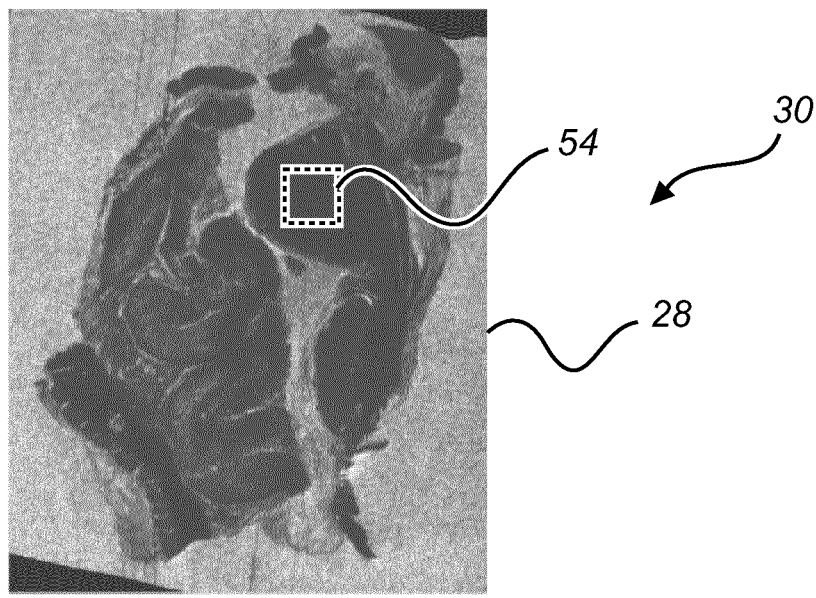
FIG. 3B shows a digital sample image registered with the reference image of FIG. 3A.

FIGS. 3A and 3B show the results of registration of the reference (H&E slide) image 32 and the digital sample image 30 of an unstained paraffin-embedded tissue. The reference removing area 36 is illustrated as a square for explanation of the present techniques. The registration device 14 is configured to identify a sample removing area 54 (see FIG. 3B) in the digital sample image 30 based on the reference removing area 36 in the reference image 32.

As a further option, also illustrated in FIG. 1, the system 19 further comprises a marking device 56. The marking device 56 is configured to provide a removing mark (not further shown) on the sample slide 26 based on the sample removing area 54 identified in the digital sample image 30.

A removing mark may be for example a colored or patterned mark for indicating the area on the sample slide 26, in which biological material is to be removed.

A dissection device 58, shown as an option in FIG. 1, may be provided, which is configured to remove biological material in a removing area (not further shown) from the sample slice 28. The removing area is provided based on the sample removing area 54 identified in the digital sample image 30.

In other words, the dissection device 58, based on the detection of the removing area according to the information provided by the registration results, removes e.g. tissue inside the removing area for the purpose of e.g. molecular diagnostic tests that are performed on the region(s). For example, selected tissues inside the removing area may be scraped off from multiple slides and pooled into a single test tube.

Figure 4:
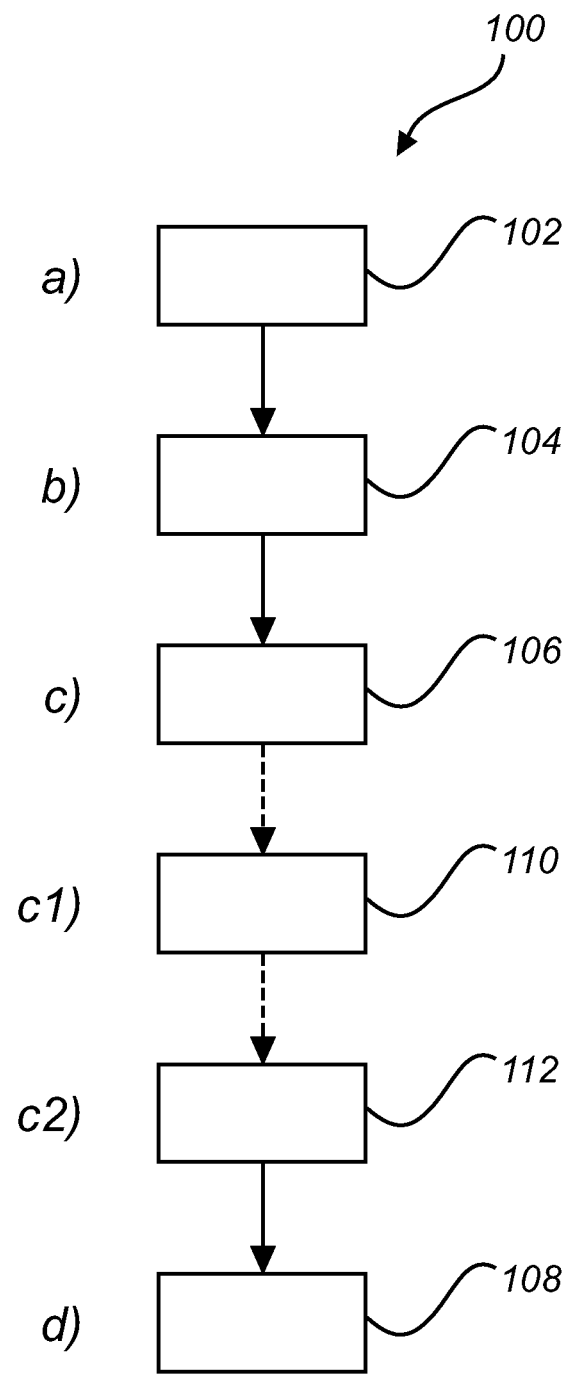
FIG. 4 shows an example of basic method steps of a method for integrating digital pathology with molecular diagnostics.

FIG. 4 shows an example of basic steps of a method 100 for selecting a sample removing area of an unstained sample to be removed for molecular diagnostic. The method 100 comprises the following steps:

In a first step 102, also referred to as step a), a reference removing area is selected in a reference image of a reference slice of an object, wherein biological material in the reference slice is stained.

In a second step 104, also referred to as step b), a digital sample image of a sample slice of the object is obtained under an imaging setting. The biological material in the sample slice is unstained. The sample slice is received on a sample slide and positioned in an optical path between a light source and an image detector. In the optical path between the light source and the image detector, it is further provided a contrast enhancing arrangement for improving contrast between the unstained biological material and background. Light is provided passing through the sample slice to be received by the image detector.

In a third step 106, also referred to as step c), the digital sample image is registered with the reference image for translating the reference removing area in the reference image to the digital sample image.

In a fourth step 108, also referred to as step d), a sample removing area is identified in the digital sample image based on the translated reference removing area.

In an example, the contrast enhancing arrangement comprises a polarizer arrangement with a plurality of polarizers and an optical filter arrangement with at least one optical filter.

According to an example, shown in FIG. 4 as an option (indicated with dotted lines), the third step 104, or step b), further comprises: c1) acquiring 110 a further digital sample image of the sample slice under a different imaging setting; and c2) providing 112 a sum of the digital sample image and the further digital sample image as a digital sample image for use in step c).

The digital sample image may be referred to as first digital sample image, while the further digital sample image may be referred to as second digital sample image.

To facilitate the explanation of the present technique, a combination of two digital sample images with different imaging settings will be discussed. It is to be understood that a combination of three or more digital sample images with different imaging settings are also within the scope of the present technique.

The combination of two or more digital sample images is used to remove or suppress the variability of intensity in the background of the digital sample image with polarizers, which is caused by the varying orientation of the birefringent crystals of the paraffin layer. Two effects need to be distinguished, isoclinics and isochromatics. The first, i.e. isoclinics, determines the orientation of the crystal with respect to the orientation of the axis of the second polarizer. When this is parallel the crystal will appear dark on the image. The second, i.e. isochromatics, are lines of equal phase difference between the ordinary and extraordinary beam of light as it transmits the crystal. The phase difference depends on the birefringence (which is intrinsic to the paraffin crystal), the thickness (which is fixed) and the wavelength of the light. The phase difference will cause interference and thus attenuation of the intensity.

The imaging setting of step b) comprises at least one parameter of the group of: mutual orientation of polarizers within the polarizer arrangement, orientation of the polarizer arrangement with respect to the sample slice, wavelength of the light; and arrangement of a birefringent medium in the optical path.

In an example, one of the polarizer is kept in a fixed orientation, and the other polarizer is rotated to achieve a different mutual orientation between the first and second polarizers in the first and second image acquisitions. In this case, the transmission of the non-birefringent part will change.

In an example, the rotation of one polarizer can be done simultaneously with the other polarizer to keep the relative orientation of the polarizers fixed, whilst the rotation of two polarizers with respect to the sample slide is changed. In this case, the object of interest, e.g. tissue, and glass background will be unaffected. When both polarizers are rotated synchronously, the isoclinics will move with the analyser. Crystals that appeared dark can become bright, depending on the rotation angle and the principal direction of the crystal. The intensity of the crystal will oscillate with the $\cot(2\chi)$, where $\chi$ is the orientation of the crystal with respect to the analyser.

A change of wavelength in the first and second image acquisitions may be achieved in several ways. In an example, switchable polychromatic light sources, like LED-arrays may be used, for switching the light from e.g. a blue spectrum to a red spectrum. In a further example, it is possible to use a white light source with a colour filter for changing the wavelength in the first and second image acquisition. Switchable filters may be used to avoid mechanical attenuation.

The arrangement of a birefringent medium in the optical path is used to change the phase difference in the image. By choosing the orientation of the birefringent medium parallel to the analyzer, it will not affect the intensity in the areas of the sample that are not birefringent and in this way it will not affect the brightness of these areas. Alternatively, this birefringent layer can be chosen such that it will add exactly N times (N is a positive integer) the wavelength when a line source is used.

Figure 5:
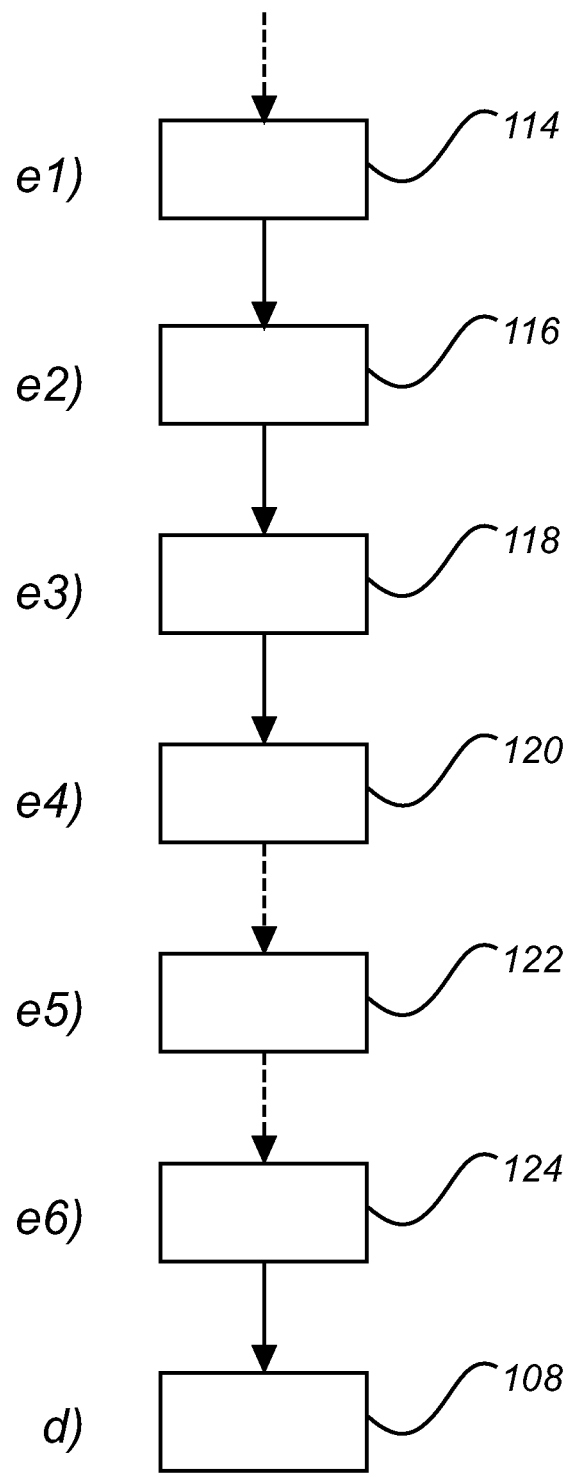
FIG. 5 shows a further example of a method.

As a further option, shown in FIG. 5, the following steps are provided before step c): e1) calculating 114 an average intensity value of a background area in the digital sample image; e2) clipping 116 intensity values that are higher than the calculated average intensity value to provide a clipped digital sample image; e3) performing 118 morphological closing of intensity values of the clipped image to provide a closed digital sample image; and e4) providing 120 the closed reference image as a reference image for use in step c).

As a further option, it is further provided: e5) performing 122 morphological closing of intensity values in the reference image to provide a closed reference image; and e6) providing 124 the closed reference image as a reference for use in step c).

The term "background area" relates to the area in the digital sample image without containing any biological material, like a tissue. In other words, the background area contains only paraffin.

In an example, a tissue detecting algorithm may be implemented for distinguishing between biological material and the background area such that the background area may be identified automatically.

In a further example, a user may select a background area directly in the digital sample image, for example, by moving a cursor.

The term "to clip" relates to limiting an intensity value once it exceeds a threshold (average intensity value in the present example). In other words, intensity values higher than the average intensity value are clipped or set to be identical to the average intensity value.

The term "morphology" relates to the geometrical arrangement of elements of the formation that have a low value for the measured physical parameter (intensity value in the present example), and of elements of the formation having a high value for the parameter.

Morphological closing is used to "close" gaps in and between image objects. Morphological closing is an increasing operation, composed of a known morphological dilation operation followed by a known morphological erosion operation.

Figure 6A:
FIG. 6A shows a further example of a digital sample image.
Figures 6B, 6C, 6D:
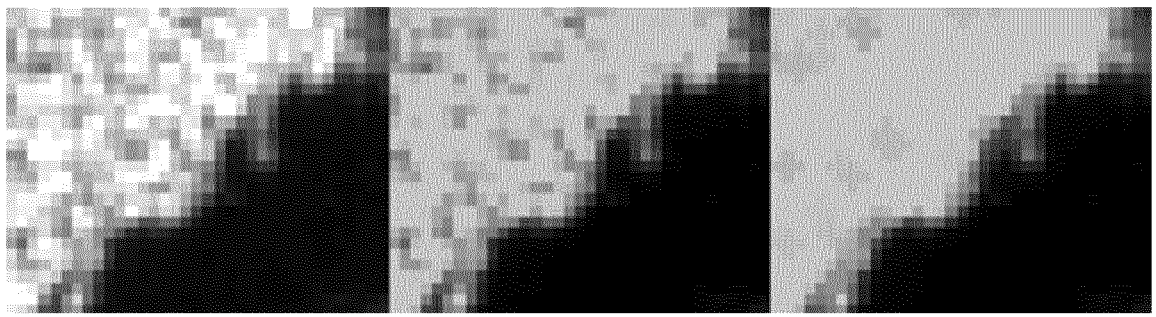
FIG. 6B shows an enlarged region of FIG. 6A.
FIG. 6C shows a clipped digital sample image of FIG. 6B.
FIG. 6D shows a closed digital sample image of FIG. 6C.

An example of a digital sample image of a paraffin embedded unstained tissue is illustrated in FIG. 6A. In FIG. 6A, a square box highlights a small region that is shown enlarged in FIG. 6B. FIG. 6C shows the clipped digital sample image after clipping intensity values that are higher than the calculated average intensity value (bright intensities) in FIG. 6B. FIG. 6D shows the closed digital sample image after morphological closing of intensity values in the background area of the clipped image of FIG. 6C.

The purpose of the image processing steps is to turn the background area (the structure in the area around the tissue, i.e. the area containing only paraffin) into a smoother pattern that is more similar to the smooth background observed in the reference image (e.g. H&E image).

Firstly, in step e1), an average intensity value of a background area in the digital sample image is calculated. The average intensity value may for example be obtained by analysis of the histogram of intensities in the digital sample image. The pixels in the background area are relatively bright because no light is absorbed by the tissue. The pixels in the background together form a peak in the histogram around the histogram bins of relatively bright intensity. The intensity value that belongs to the maximum value of this peak represents the average intensity of the background.

Next, in step e2), the pixels that are brighter than the calculated average intensity value are clipped. The result of the clipping process is illustrated in FIG. 6C.

It is also noted that the average intensity value in steps e1) and e2) may be calculated locally and/or globally. For example, the background intensity in the digital sample image may not be uniform. Examples are unevenness in the thickness of the sample slice, non-uniformity in illumination, non-uniformity in the polarizers, etc. In case of strong non-uniformity, the representation of the background intensity by a single (global) value may not be accurate. In case of non-uniformity in the illumination and/or polarizers, a calibration image can be used to measure the non-uniformity and to remove the non-uniformity from the image of the paraffin-only tissue. Non-uniformity caused by unevenness in the thickness of the paraffin sample can be addressed by means of local instead of global image analysis techniques.

After clipping, the background may still contain a pattern of dark spots (see FIG. 6C). As a next step, in step e3), these spots are suppressed by means of a morphological closing of the intensity values of the clipped image. The result of the morphological closing process is illustrated in FIG. 6D.

Various examples will be contemplated for performing the morphological closing.

In an example, the morphological closing may be performed on the background data, but not on the data that belongs to tissue. As indicated above, distinguishing between tissue and background may require a tissue detection step.

In a further example, the morphological closing may be applied on both the background and tissue areas. The structure inside the tissue area that is affected by the morphological closing may be compensated by an optional morphological closing of the reference image. In other words, as an option, steps e5) and e6) may be provided for performing morphological closing in the reference image such that the similarity in appearance of the image pair— digital sample image and reference image—is improved.

Afterwards, in step e4), the closed digital sample image is provided as a digital sample image for use in step c).

In this manner, the variability of intensity in the background of the digital sample image may be removed (or at least suppressed). This may result in an improved similarity between the digital sample image and the reference image, thus improving the registration process.

It is noted that the alphabet symbols (letters) used for the method steps, are used to differentiate the method steps, which symbols, however, are not meant to limit the order of the method steps to the alphabet sequence.

In an example, the digital sample image may be registered based on the following sequential steps: a), b), c1), c2), c) and d).

In a further example, the digital sample image may be registered based on the following sequential steps: a), b), c1), c2) e1)-e6), c), and d).

In a still further example, the digital sample image may be registered based on the following sequential steps: a), b), e1)-e4), c), and d).

Figure 7:
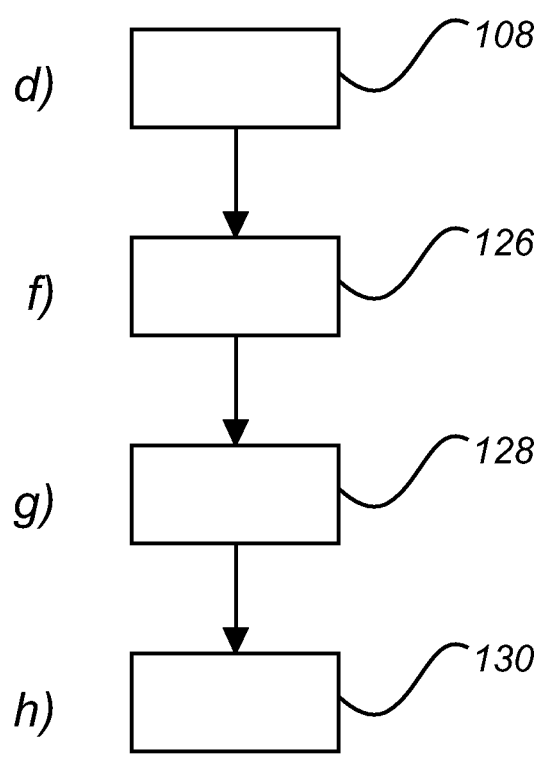
FIG. 7 shows a still further example of a method.

As a further option, shown in FIG. 7, at least one of the following steps is provided after step d): f) identifying 126 a sample removing area in the digital sample image based on the reference removing area in the reference image; g) providing 128 a removing mark on the sample slide based on the sample removing area identified in the digital sample image; and h) removing 130 biological material in an removing area from the sample slice, wherein the removing area is provided based on the sample removing area identified in the digital sample image.

In another exemplary embodiment of the present invention, a computer program or a computer program element is provided that is characterized by being adapted to execute the method steps of the method according to one of the preceding embodiments, on an appropriate system.

The computer program element might therefore be stored on a computer unit, which might also be part of an embodiment of the present invention. This computing unit may be adapted to perform or induce a performing of the steps of the method described above. Moreover, it may be adapted to operate the components of the above described apparatus. The computing unit can be adapted to operate automatically and/or to execute the orders of a user. A computer program may be loaded into a working memory of a data processor. The data processor may thus be equipped to carry out the method of the invention.

This exemplary embodiment of the invention covers both, a computer program that right from the beginning uses the invention and a computer program that by means of an up-date turns an existing program into a program that uses the invention.

Further on, the computer program element might be able to provide all necessary steps to fulfil the procedure of an exemplary embodiment of the method as described above.

According to a further exemplary embodiment of the present invention, a computer readable medium, such as a CD-ROM, is presented wherein the computer readable medium has a computer program element stored on it which computer program element is described by the preceding section.

A computer program may be stored and/or distributed on a suitable medium, such as an optical storage medium or a solid state medium supplied together with or as part of other hardware, but may also be distributed in other forms, such as via the internet or other wired or wireless telecommunication systems.

However, the computer program may also be presented over a network like the World Wide Web and can be downloaded into the working memory of a data processor from such a network. According to a further exemplary embodiment of the present invention, a medium for making a computer program element available for downloading is provided, which computer program element is arranged to perform a method according to one of the previously described embodiments of the invention.

It has to be noted that embodiments of the invention are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

The figures are only schematically illustrated and not to scale. Same reference signs refer to same or similar features throughout the figures.

In the claims, the word "comprising" does not exclude other elements or steps, and the indefinite article "a" or "an" does not exclude a plurality. A single processor or other unit may fulfil the functions of several items re-cited in the claims. The mere fact that certain measures are re-cited in mutually different dependent claims does not indicate that a combination of these measures cannot be used to advantage. Any reference signs in the claims should not be construed as limiting the scope.

The invention claimed is:

1. A method for selecting a sample removing area of an unstained tissue sample to be removed for molecular diagnostic, comprising the following steps:
   a) selecting a reference removing area in a reference image of a reference slice of an object; wherein biological material in the reference slice is a stained tissue sample;
   b) obtaining a digital sample image of a sample slice of the object under an imaging setting; wherein the biological material in the sample slice is an unstained tissue sample embedded in paraffin;
      wherein the sample slice is received on a sample slide and positioned in an optical path between a light source and an image detector of a bright field microscope, wherein in the optical path between the light source and the image detector, it is further provided a contrast enhancing arrangement for improving contrast between the unstained biological material embedded in paraffin and background; and
      wherein light is provided passing through the sample slice to be received by the image detector;
   c) registering the digital sample image with the reference image and translating the reference removing area in the reference image to the digital sample image; and
   d) identifying a sample removing area in the digital sample image based on the translated reference removing area.

2. The method of claim 1, wherein the contrast enhancing arrangement comprises:
   a polarizer arrangement with a plurality of polarizers; and
   an optical filter arrangement with at least one optical filter.

3. The method of claim 1, wherein step b) further comprises:
   c1) acquiring a further digital sample image of the sample slice under a different imaging setting; and
   c2) providing a sum of the digital sample image and the further digital sample image as a digital sample image for use in step c).

4. The method of claim 1, wherein the imaging setting of step b) comprises at least one parameter of the group of:
   mutual orientation of polarizers within the polarizer arrangement;
   orientation of the polarizer arrangement with respect to the sample slice;
   wavelength of the light; and
   arrangement of a birefringent medium in the optical path.

5. The method of claim 1, wherein the following steps are provided before step c):
   e1) calculating an average intensity value of a background area in the digital sample image;
   e2) clipping intensity values that are higher than the calculated average intensity value to provide a clipped digital sample image;
   e3) performing morphological closing of intensity values of the clipped image to provide a closed digital sample image; and
   e4) providing the closed digital sample image as a digital sample image for use in step c);
      wherein preferably, it is further provided:

e5) performing morphological closing of intensity values in the reference image to provide a closed reference image; and e6) providing the closed reference image as the reference image for use in step c).

6. The method of claim 1, wherein at least one of the following steps is provided after step d):

f) identifying a sample removing area in the digital sample image based on the reference removing area in the reference image;

g) providing a removing mark on the sample slide based on the sample removing area identified in the digital sample image; and h) removing biological material in an removing area from the sample slice, wherein the removing area is provided based on the sample removing area identified in the digital sample image.

7. A system for selecting a sample removing area of an unstained sample to be removed for molecular diagnostic, comprising a bright field microscope; and
a registration device;
wherein the microscope comprises:
a light source;
an object receiving arrangement; and
an image detector;
wherein the light source and the image detector are arranged in an optical path;
wherein the light source is configured to provide light passing through a sample slide to be received by the image detector;
wherein the object receiving arrangement is configured to receive a sample slide with a sample slice of an object, wherein biological material in the sample slice is unstained and embedded in paraffin, and to position the sample slice in the optical path for acquiring a digital sample image of the sample slice; wherein in the optical path between the light source and the image detector, it is further provided a contrast enhancing arrangement for improving contrast between unstained biological material embedded in paraffin and background; and
wherein the registration device is configured to receive a reference image of a reference slice of the object, wherein the biological material in the reference slice is stained, and wherein a reference removing area is selected in the reference image; and
wherein the registration device is further configured to register the digital sample image with the reference image, to translate the reference removing area in the reference image to the digital sample image and to identify a sample removing area in the digital sample image based on the translated reference removing area.

8. The system of claim 7, wherein the contrast enhancing arrangement comprises a polarizer arrangement, the polarizer arrangement comprising:

a first polarizer; and
a second polarizer;

wherein the object receiving arrangement is configured to position the sample slice in the optical path between the first polarizer and the second polarizer for image acquisition.

9. The system of claim 7, wherein the contrast enhancing arrangement comprises an optical filter arrangement with at least one optical filter selected from the group of:

a colored glass filter;
a colored plastic filter;
a gelatin filter;
a dielectric filter; and
a plasmonic filter.

10. The system of claim 7, wherein the registration device is configured to identify a sample removing area in the digital sample image based on the reference removing area in the reference image.

11. The system of claim 7, further comprising;

a marking device;
wherein the marking device is configured to provide a removing mark on the sample slide based on the sample removing area identified in the digital sample image.

12. The system of claim 7, further comprising:

a dissection device;
wherein the dissection device is configured to remove biological material in a removing area from the sample slice, wherein the removing area is provided based on the sample removing area identified in the digital sample image.

13. A non-transitory computer readable medium having stored thereon program code which, when executed by a processor, causes the processor to:

a) select a reference removing area in a reference image of a reference slice of an object; wherein biological material in the reference slice is a stained tissue sample;

b) obtain a digital sample image of a sample slice of the object under an imaging setting; wherein the biological material in the sample slice is an unstained tissue sample embedded in paraffin;

wherein the sample slice is received on a sample slide and positioned in an optical path between a light source and an image detector of a bright field microscope, wherein in the optical path between the light source and the image detector, it is further provided a contrast enhancing arrangement for improving contrast between the unstained biological material embedded in paraffin and background; and wherein light is provided passing through the sample slice to be received by the image detector;

c) register the digital sample image with the reference image and translating the reference removing area in the reference image to the digital sample image; and d) identify a sample removing area in the digital sample image based on the translated reference removing area.

14. A computer unit storing a computer program, the computer unit adapted by the computer program to execute the method steps of claim 1.

* * * * *